United States Patent [19]

Glickman

[11] 4,081,230
[45] Mar. 28, 1978

[54] EXTRUDATE CUTTING DEVICE
[75] Inventor: Leslie N. Glickman, Flanders, N.J.
[73] Assignee: American Cyanamid Company, Stamford, Conn.
[21] Appl. No.: 553,367
[22] Filed: Feb. 26, 1975
[51] Int. Cl.² ............................................... B29F 3/00
[52] U.S. Cl. .................................. 425/192 R; 225/4; 225/103; 264/118; 264/143; 425/311; 425/382 R
[58] Field of Search ................. 83/343, 344, 345, 346, 83/347, 348, 349, 665, 334; 264/148, 150, 141, 143, 118, 142; 425/190, 191, 192, 298, 308, 311, 312, 313, 325, 188, 382; 225/4, 93, 103; 426/516, 518

[56] References Cited

U.S. PATENT DOCUMENTS

| 2,252,900 | 8/1941 | Shafer | 425/311 |
|---|---|---|---|
| 2,560,061 | 7/1951 | Agamaite, Jr. | 83/334 X |
| 2,614,290 | 10/1952 | Street | 425/311 |
| 2,642,643 | 6/1953 | Montague | 264/142 X |
| 2,739,546 | 3/1956 | Bonnafoux | 425/308 |
| 3,360,827 | 1/1968 | Aichele | 425/311 X |
| 3,415,206 | 12/1968 | Reisman | 425/311 |
| 3,491,641 | 1/1970 | Vandenberg | 83/346 |
| 3,868,469 | 2/1975 | Chalin | 426/516 X |
| 3,920,783 | 6/1976 | Hara et al. | 225/103 X |

Primary Examiner—Francis S. Husar
Assistant Examiner—Mark Rosenbaum
Attorney, Agent, or Firm—Frank M. Van Riet; Bruce F. Jacobs

[57] ABSTRACT

An extrudate cutting device comprising (a) a frame means, (b) attachment means mounted on said frame means for attachment thereof to the extrusion end of an extruder, (c) second attachment means mounted on said frame means and adapted to receive a rotatable elongated cutting means and (d) elongated cutting means rotatably mounted on said second attachment means and a method of cutting extrudate into substantially identically sized sections, are disclosed.

5 Claims, 3 Drawing Figures

ID=4,081,230

EXTRUDATE CUTTING DEVICE

BACKGROUND OF THE INVENTION

In the production of extruded materials whereby such materials as ceramics, polymers, gels etc. are extruded into sections, it is often extremely critical that the sections be of identical or substantially identical size and shape. In the catalyst industry, for example, gels of silica, alumina etc. are extruded into sections which are to be packed tightly into columns etc. In many instances, the efficiency of the particular process which employs the catalyst bed, is totally dependent upon the catalyst. In such procedures, often times the mere packing of the catalyst means the difference between whether the process is a raving success or another "me too" system.

Successful packing of a column, etc., with a catalyst among other requirements, depends somewhat upon the shape and size of the catalyst particles, i.e. the more identical, the better the packing. In the past, many attempts have been made to devise apparatuses, systems and procedures for producing extrudate sections of substantially identical shape and size. For example, the industry has experienced the use of cutting knives which slice the extrudate from the extruder die plate as it emerges. However, since the pressure in the extruder is not uniform over the entire surface area of the die plate due to the worm screw therein, the extrudate is more rapidly extruded at the center of the die plate than at its peripheral edges. The extrudate sections are therefore not of uniform length. Cutting wires are also inadequate for the same reason.

One of the most widely used methods of cutting extrudates comprises extending material into a rapidly spinning disc. The rotary motion of the disc, when it is hit by the extrudate, causes breakage of the extrudate at the point where it emerges from the die. This type of cutter, however, also fails to produce sections of extrudate of even length if it is about the same size or slightly larger than the die plate in diameter, because the rotating disc travels faster at its outer edge than at its center. It therefore causes the extrudate to break at a different place along its length at the outside edge than at the center of the disc. If the disc is greatly enlarged so as to enable the extrusion of the material into an area thereof which is traveling about the same speed across its diameter, substantially identical lengths of extrudate are produced but the disc must be so large so as to render it cumbersome. Furthermore, disc type cutters cannot practically be attached to extruders in such a manner so as to allow facile replacement and/or cleaning of the die plate without complete removal of the cutter. Disc cutters also spray the extrudate sections in a random manner so that they collide and become damaged or adhere to one another and otherwise are rendered less useful.

SUMMARY OF THE INVENTION

I have now discovered a new and useful apparatus capable of cutting extrudate into sections of substantially identical size and shape. My apparatus is small and compact, i.e. about one cubic foot of space is required, in comparison to prior art apparatuses and, in fact, can replace machinery occupying up to 100 cubic feet. Furthermore, since it is smaller and more lightweight, the power source used to drive it is also smaller.

My apparatus utilizes a rotating roller to cut or break-off the extrudate into small sections. It has been shown to reduce the unacceptable finished product up to 50% in comparison with prior apparatus usage.

DESCRIPTION OF THE INVENTION INCLUDING PREFERRED EMBODIMENTS

Basically, the novel extrudate cutting device of the instant invention comprises
 (a) frame means,
 (b) means mounted to said frame means for attachment thereof to an extruder,
 (c) means mounted on said frame means and adopted to receive a rotatable elongated cutting means and
 (d) elongated cutting means rotatably mounted in said (c). The device also includes
 (e) means for adjusting the distance between said elongated cutting means and the extrusion end of said extruder. Means (b) can be pivotly mounted on the extruder and the cutting means can comprise one, two, three or more cylindrical rollers, each rotatable in directions opposite that of which it is adjacent along their longest axes.

Figure 1:
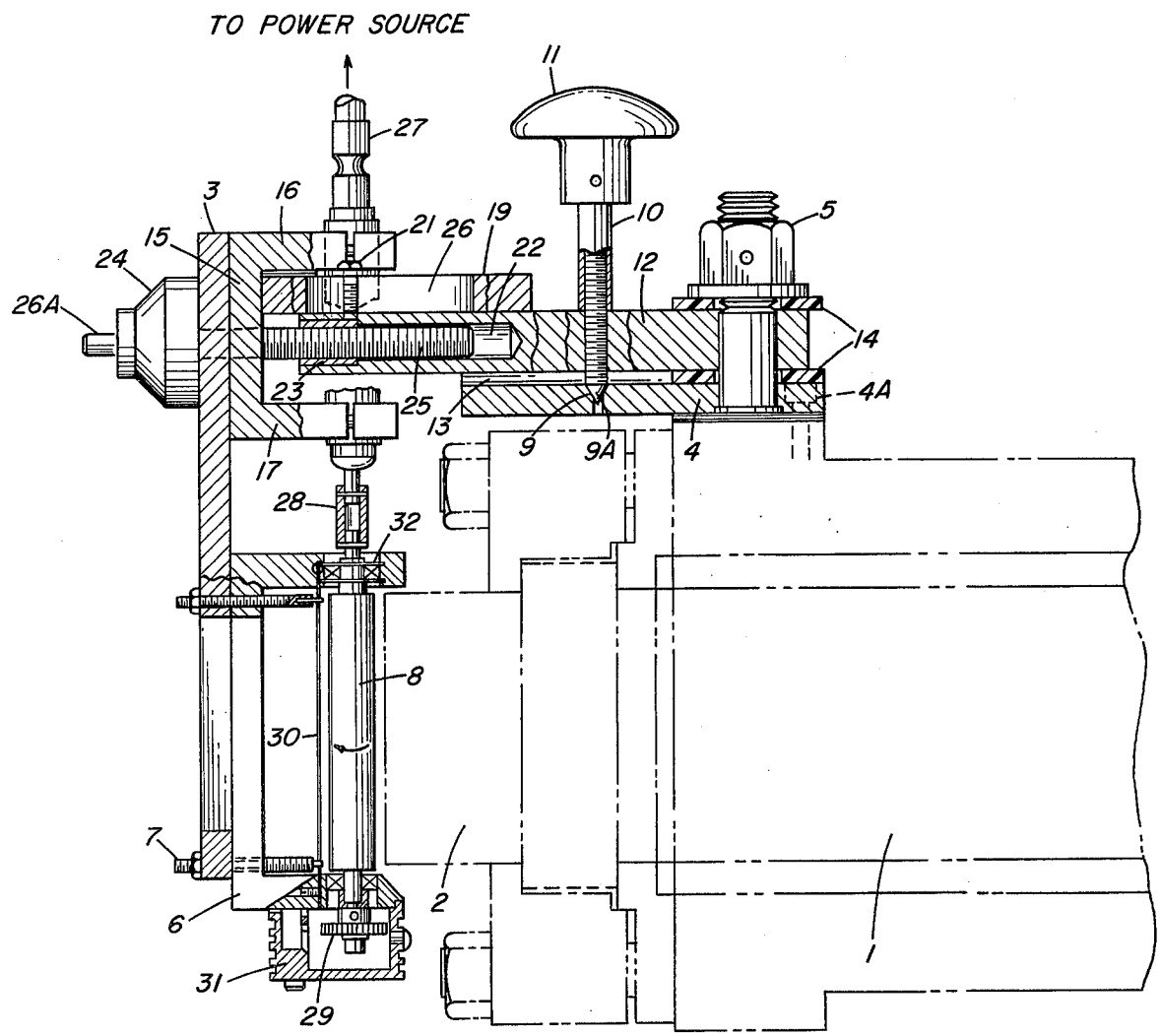
FIG. 1 is a sectional view of my novel cutting device shown mounted on the extrusion end of an extruder.

More specifically, with reference to FIG. 1 of the drawings, there is shown an extruder 1 equipped with extrusion die 2 at the extrusion end thereof. The cutting device of the instant invention comprises frame means 3 which is preferably of steel but can be of any other metal or material, as can be the other components of the device described hereinbelow. Means 3 is mounted on the extruder via means 4. Means 4 is a locator plate which is securely mounted on the extruder via screw means 4A. Means 6 is mounted at the other end of frame means 3 by securing means, best shown at FIG. 2, and is adapted to receive cutting means 8.

Referring back to plate means 4, there is provided therein conical stop means 9 which is adapted to receive the conical end 9A of screw adjustor 10 which is, in turn, fitted with palm hand knob 11 for easy manipulation. Swing plate 12 is separated from plate 4 by swing plate spacer 13 and washer 14. When adjustor 10 is unscrewed from plate 4 sufficiently to remove end 9A from means 9, swing plate 12 is free to pivot around pivoting means 5 since it is only slightly tightened. This manipulation allows the operator to view, replace, examine, clean, etc. extrusion die 2 without removing the cutting device from the extruder as is required with most other devices. The cutting device is also equipped with means for adjusting the distance between the extrusion die 2 and cutting means 8. The adjusting means comprises collet plate 15, which is composed of upper portion 16 and lower portion 17, and which is secured to guide plate 19 by means 20, FIG. 3. Plate 19 is, in turn, secured to swing plate 12 by means 21. The end of swing plate 12 is provided with horizontal aperture 22 which is fitted with threaded means 23. A micrometric adjusting means 24 is fitted to the end of threaded rod 25 whereby adjustment thereof slides the device so as to meter the distance between die 2 and roller cutters 8 accurately. As can best be seen in FIG. 3, movement of means 24 causes guide plate 19 to move along slots 26 once means 21 have been loosened. Best cutting effect has been achieved with the cutting means from about 0.1 to about 0.5 inch from the face of die 2. Guide rods 26A function to retain collet 15 in alignment. These rods are removeably positioned in holes at the front end of plate 12.

Figure 2:
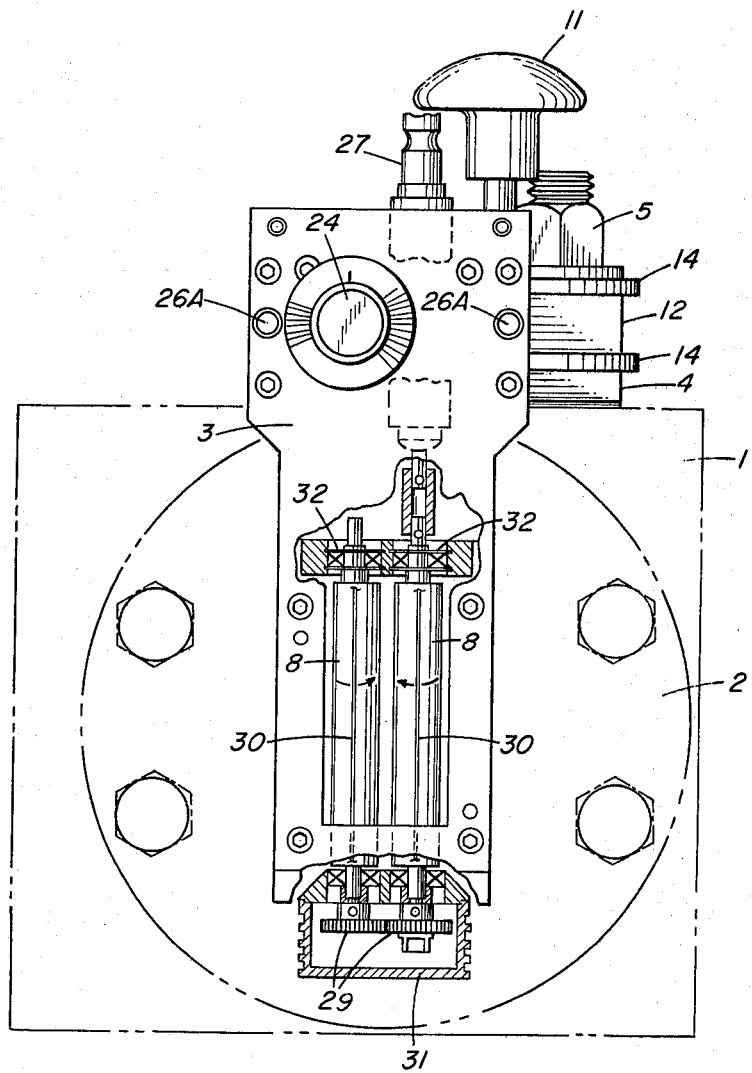
FIG. 2 is a sectional view of the instant cutting device looking from the left of FIG. 1.

Cutting means 8, which can comprise one or more rollers, as mentioned above, are positioned on plate 6 by any conventional method such as by bearing 32 and are attached to a power source via rod 27 and coupling 28. As is best seen in FIG. 2, the cutting means comprises a pair of rollers each of which rotate laterally in opposite directions, the intermeshed gears 29 driving the rollers not attached directly to the variable speed power source. Oil cup 31 is provided so as to enable lubrication of gears 29. Wires 30 are positioned behind cutting means 8 so as to remove debris therefrom as the roller passes by. The distance between the wire and the roller can be adjusted by means 7.

Referring to FIG. 2, this frontal view of my novel cutting device best shows the preferred configuration and placement of cutting means 8. As can be seen, the cutting means comprises a pair of oppositely vertically rotating rollers. Although two rollers are shown, any number of rollers can be used, i.e. one, three, four etc. Each roller may be powered individually although it is preferred that one power source drive them all so that constant speed may be attained for all. The positioning and configuration of cutting means 8 must conform substantially to the configuration of the holes in die 2. That is to say, in order that each extrudate be cut into the same size and shape, it is necessary that each extrudate come into contact with each roller at the same distance from the die and at substantially the same lengthwise axis of the roller. As can be seen, since the rollers are spinning at from about 5–45,000 RPM, preferably 1,000–25,000 RPM, if the extrudate contacts the roller at different points not on the same vertical axis, each extrudate will be of different length and each will be of different shape because of the curvature of the roller and the effect of the frictional speed at the point of contact.

The rollers can be produced from a variety of different materials including metal, wood, plastic, ceramics, etc. A preferred roller is produced from carbon steel coated with tungsten carbide.

Figure 3:
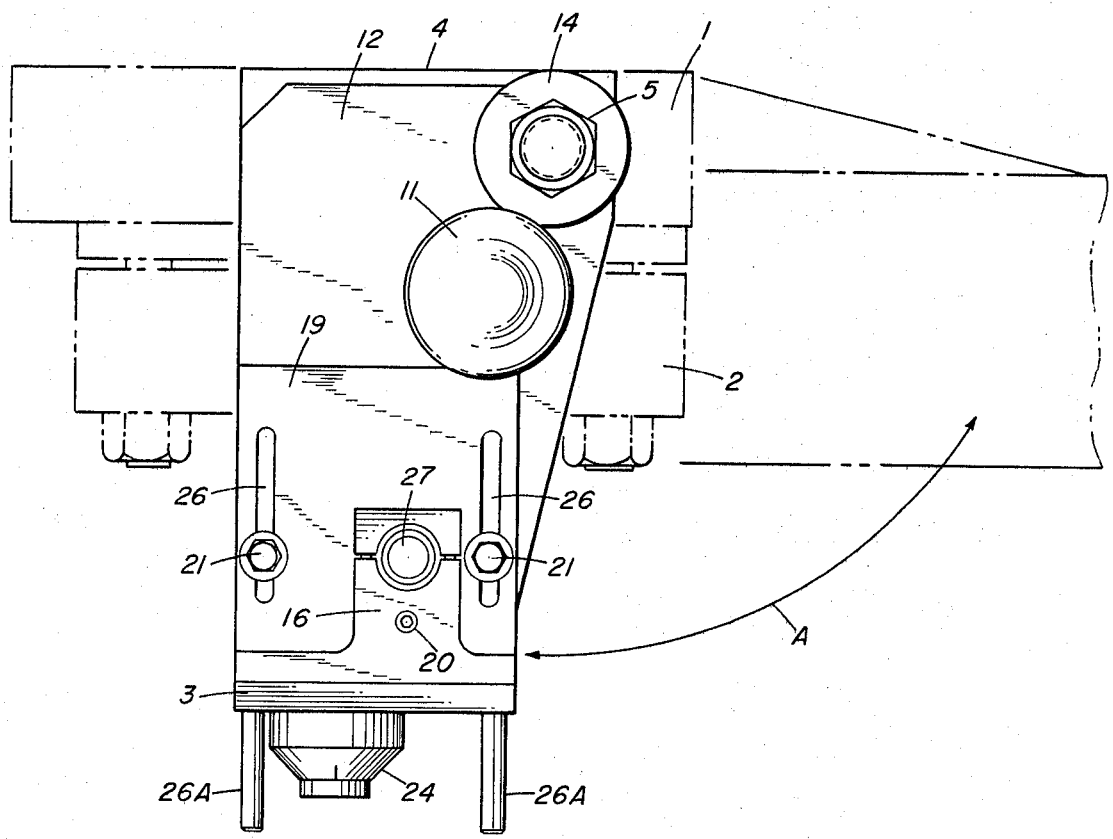
FIG. 3 is a top view of the cutting device as shown at FIG. 1.

FIG. 3 best exemplifies the pivoting feature of my novel device. As is mentioned above, it is often times necessary to clean die 2 and since the cutter is so closely positioned with regard thereto, it has been previously necessary to remove the entire cutting device. My invention enables the device to be merely swung away from the die face by unscrewing adjustor 10 with palm knob 11 so as to remove conical end 9A from stop means 9. The entire mechanism can then be swung along the route shown by arrow A. Not only can the die face be cleaned or replaced in this manner, but cutting means 8 can also be inspected.

A suitable hood, not shown, can be placed around the device so as to retain the extrudate particles being thrown away from cutting means 8 by the centrifical force of the rollers, and enable them to be collected in a suitable collection device.

I claim:
1. An extrudate cutting device comprising:
an extruder fitted with an extrusion die plate having orifices therein,
frame means,
fastening means at one end of said frame means for attaching said frame means to said extruder,
adaptor means at the other end of said frame means receiving a rotatable elongated cutting means means,
said elongated cutting means comprising at least one cylindrical roller rotatably mounted in said frame means such that the axis of said roller is located in the direct path of extrudates leaving said orifices of said extrusion die plate of said extruder.
2. An extrudate cutting device according to claim 1 including
means operably associated with said cutting means for adjusting the distance between said elongated cutting means and the extrusion end of said extruder.
3. An extrudate cutting device according to claim 1 wherein said frame means is pivotably mounted on said extruder.
4. An extrudate cutting device according to claim 1 wherein said cutting means comprises a pair of cylindrical rollers mounted so as to rotate in opposite directions along their longest axes in an external direction in relation to said extrusion die plate.
5. An extrudate cutting device according to claim 3 wherein said frame means has a pivot stop positioned therein.

* * * * *